US012584348B2

(12) United States Patent
Hancock et al.

(10) Patent No.: US 12,584,348 B2
(45) Date of Patent: Mar. 24, 2026

(54) LIFT- AND-SLIDE HANDLE ASSEMBLY

(71) Applicant: AUTOSLIDE PTY LTD, Wetherill Park (AU)

(72) Inventors: Mark Hancock, Wetherill Park (AU); Tim Gulliver, Wetherill Park (AU); Oleksandr Fatiuk, Wetherill Park (AU)

(73) Assignee: AUTOSLIDE PTY LTD, Wetherill Park (AU)

( * ) Notice: Subject to any disclaimer, the term of this patent is extended or adjusted under 35 U.S.C. 154(b) by 412 days.

(21) Appl. No.: 18/009,758

(22) PCT Filed: Jun. 12, 2021

(86) PCT No.: PCT/AU2021/050606

§ 371 (c)(1),
(2) Date: Dec. 12, 2022

(87) PCT Pub. No.: WO2021/248211

PCT Pub. Date: Dec. 16, 2021

(65) Prior Publication Data

US 2023/0287730 A1 Sep. 14, 2023

(30) Foreign Application Priority Data

Jun. 12, 2020 (AU) ................................ 2020901945

(51) Int. Cl.
*E06B 3/52* (2006.01)
*E05D 15/56* (2006.01)
(Continued)

(52) U.S. Cl.
CPC .............. *E06B 3/52* (2013.01); *E05D 15/565* (2013.01); *E05F 11/54* (2013.01); *E05F 15/73* (2015.01);
(Continued)

(58) Field of Classification Search
CPC .......... E06B 3/52; E06B 3/4636; E05F 15/73; E05F 15/77; E05F 11/54; E05D 15/565;
(Continued)

(56) References Cited

U.S. PATENT DOCUMENTS 8,595,977 B2 * 12/2013 Hancock ............... E05F 15/635 49/362
2007/0271850 A1 * 11/2007 Mickelson ............ E05F 15/638 49/404
(Continued)

FOREIGN PATENT DOCUMENTS

DE 102018126770 A 4/2020
DE 102018126770 A1 * 4/2020 ........... E05D 15/565
(Continued)

OTHER PUBLICATIONS

International Search Report dated Aug. 16, 2021 which issued on PCT/AU2021/050606.

*Primary Examiner* — Kristina R Fulton
*Assistant Examiner* — James Edward Ignaczewski
(74) *Attorney, Agent, or Firm* — Thomas Joseph

(57) ABSTRACT

There is disclosed a lift-and-slide handle assembly (10) which includes a drive shaft (28) operatively adapted to couple with a roller actuating assembly of a lift-and-slide roller carriage. The lift-and-slide handle assembly (10) includes an electronic drive assembly (30) operatively adapted to couple with the drive shaft (28) to apply torque to the drive shaft and a manual drive assembly (32) operatively adapted to couple with the drive shaft (28) to apply torque to the drive shaft (28). The lift-and-slide handle assembly (10) further includes an override coupling assembly (34) operatively adapted to decouple the electronic drive assembly (30) from the drive shaft (28) to couple the manual drive assembly (32) to the drive shaft (28).

15 Claims, 10 Drawing Sheets

(51) Int. Cl.

| | |
|---|---|
| ***E05F 11/54*** | (2006.01) |
| ***E05F 15/73*** | (2015.01) |
| ***E05F 15/77*** | (2015.01) |
| ***E06B 3/46*** | (2006.01) |

(52) U.S. Cl.

CPC ............ *E05F 15/77* (2015.01); *E06B 3/4636* (2013.01); *E05Y 2201/216* (2013.01); *E05Y 2201/688* (2013.01); *E05Y 2400/3013* (2024.05); *E05Y 2400/614* (2013.01); *E05Y 2900/132* (2013.01)

(58) Field of Classification Search

CPC ....... E05Y 2400/3013; E05Y 2400/614; E05Y 2201/216; E05Y 2201/688; E05Y 2900/132

USPC ....................................................... 292/336.3

See application file for complete search history.

(56) References Cited

U.S. PATENT DOCUMENTS

| | | | | |
|---|---|---|---|---|
| 2011/0094160 | A1* | 4/2011 | Houser | E05F 15/63 49/31 |
| 2013/0074409 | A1* | 3/2013 | Hsieh | E06B 9/80 49/139 |
| 2014/0047770 | A1* | 2/2014 | Vaknin | E05C 1/08 49/352 |
| 2020/0270928 | A1* | 8/2020 | Cumbo | E05F 15/611 |
| 2021/0404239 | A1* | 12/2021 | Hall | E05F 15/41 |
| 2024/0328232 | A1* | 10/2024 | Oster | E05F 15/614 |

FOREIGN PATENT DOCUMENTS

| | | | | |
|---|---|---|---|---|
| EP | 3318707 | A1 * | 5/2018 | E05B 13/001 |
| KR | 100943890 | B1 | 2/2010 | |
| KR | 20100003980 | U | 4/2010 | |
| KR | 20180069569 | A * | 6/2018 | E05F 15/641 |
| KR | 102076670 | B1 * | 2/2020 | E05F 11/54 |
| WO | 2015/143055 | A1 | 9/2015 | |
| WO | WO-2015142055 | A1 * | 9/2015 | E05D 15/565 |

* cited by examiner

LIFT- AND-SLIDE HANDLE ASSEMBLY

CROSS REFERENCE TO RELATED APPLICATIONS

The present application is a U.S. national stage application of PCT International Application No. PCT/AU2021/050606, filed Jun. 12, 2021, and published as PCT Publication WO/2021/248211 on Dec. 16, 2021, which claims priority to Australian Application No. AU 2020901945, filed on Jun. 12, 2020. The disclosures of all the foregoing applications are hereby incorporated by reference in their entirety into the present application.

FIELD

The invention concerns a lift-and-slide handle assembly. In one particular but non-exclusive aspect the invention concerns a lift-and-slide handle assembly for a lift-and-slide closure such as a lift-and-slide door or a lift-and-slide window. The invention extends to a lift-and-slide installation.

BACKGROUND

One conventional type of exterior sliding door (non-lift-and-slide door) includes at least one active door panel having fixed rollers in place to facilitate opening and closing. This type of sliding door includes weather-stripping which is held in contact with the door frame and interlock (where the active door meets with another active door panel or fixed panel). During use the sliding door will have its weather-stripping permanently in contact with the door frame. The result of having the weather-stripping permanently in contact with the frame is that a substantial amount of friction will be encountered when opening or closing the door which will create difficulty during opening and closing. Such difficulty is even more pronounced in larger and heavier doors. A further drawback of large amounts of friction between the weather-stripping and door frame is that the longevity of the weather-stripping will be reduced.

Due to the limited longevity of its weather-stripping this type of sliding door has a reputation for ineffective sealing resulting in water and outside atmosphere leaking into a building past the sliding door. The shortcomings of conventional sliding doors are addressed in a lift-and-slide door which includes a lift-and-slide assembly which is actuated by an operator handle. By rotating the operator handle a wheel carriage of the lift-and-slide door is engaged, thereby lifting the lift-and-slide door. The lift-and-slide door can now be slid without the weather-stripping rubbing against the door frame. When the operator handle is rotated in an opposite direction the lift-and-slide door will be lowered and the weight of the door will bear down on the weather-stripping to provide continuous contact between the weather-stripping and door frame/floor to provide an effective weather barrier and good security.

One drawback associated with conventional lift-and-slide doors relate to difficulties in actuating the operator handle, particularly where a lift-and-slide door includes a heavy active door panel and the handle assembly is to be operated by a frail or elderly user.

Object

An object of the present invention is to provide a lift-and-slide handle assembly which addresses or ameliorates the difficulties associated when actuating existing lift-and-slide handle assemblies or at least to provide a useful alternative lift-and-slide handle assembly. It is also an object of the invention to provides a useful alternative lift-and-slide assembly.

SUMMARY

According to a first aspect of the present invention there is disclosed herein a lift-and-slide handle assembly including:

- a drive shaft operatively adapted to couple with a roller actuating assembly of a lift-and-slide roller carriage;
- an electronic drive assembly operatively adapted to couple with the drive shaft to apply torque to the drive shaft;
- a manual drive assembly operatively adapted to couple with the drive shaft to apply torque to the drive shaft; and
- an override coupling assembly operatively adapted to decouple the electronic drive assembly from the drive shaft to couple the manual drive assembly to the drive shaft.

Preferably the electronic drive assembly includes an electric motor for generating torque.

Preferably the electronic drive assembly includes drive gearing operatively adapted to transmit torque from the electric motor to the drive shaft.

Preferably the override coupling assembly incudes a clutch assembly operatively adapted to couple and decouple the drive gearing from the drive shaft.

Preferably the clutch assembly includes a clutch cam operatively adapted for movement between (i) a clutch engaged position in which the clutch cam couples the drive gearing to the drive shaft, and (ii) a clutch released position in which the clutch cam decouples the drive gearing from the drive shaft.

Preferably the clutch assembly includes at least one cam follower operatively associated with the drive gearing, the at least one cam follower movable between (i) a gear engaged position when the clutch cam is located in the clutch engaged position such that torque is transmitted via the cam follower from the drive gearing to the drive shaft, and (ii) a gear disengaged position when the clutch cam is located in the clutch released position such that the at least one cam follower is unable to transmit torque from the drive gearing to the drive shaft.

Preferably the drive shaft includes a cam follower slot and the drive gearing includes a corresponding drive gearing slot wherein (i) in the gear engaged position the at least one cam follower is located inside both the cam follower slot and the drive gearing slot so as to be adapted to transmit torque from the drive gearing to the drive shaft, and (ii) in the gear disengaged position the at least one cam follower is retracted into the cam follower slot so as to be unable to transmit torque from the drive gearing to the drive shaft.

Preferably the at least one cam follower is a first cam follower and the clutch assembly includes a plurality of cam followers and the drive shaft and the drive gearing include a plurality of corresponding cam follower slots and drive gearing slots.

Preferably the clutch assembly includes a clutch actuator operatively adapted to move the clutch cam between the clutch engaged position and the clutch released position.

Preferably the clutch actuator is a clutch or a tapered pin.

Preferably the clutch leadscrew is adapted to engage a complemental leadscrew thread of the clutch cam.

Preferably the clutch actuator is adapted to undergo lateral movement between an inoperative position and an operative position.

Preferably the clutch assembly includes biasing means operatively adapted to bias the clutch actuator to the inoperative position.

Preferably the override coupling assembly includes an override actuator.

Preferably the override actuator includes a push-button and a plunger, the plunger operatively adapted to couple the push-button to the clutch actuator.

Preferably the push-button is movable between a button rest position and an override position.

Preferably the push-button includes push-button biasing means operatively adapted to bias the push-button to the button rest position.

Preferably the push-button biasing means is a push button spring.

Preferably the manual drive assembly includes a handle adapted for pivotal movement.

Preferably the handle includes a handle hub.

Preferably the handle hub includes a manual coupling formation operatively adapted to cooperate with a complemental drive shaft coupling formation to apply torque to the drive shaft.

The manual coupling formation is a manual coupling keyway and the drive shaft coupling formation is a drive shaft keyway operatively adapted to be located in register with the manual coupling keyway.

Preferably the manual coupling keyway is adapted to be located in register with the drive shaft keyway upon rotation of the handle.

Preferably the manual drive assembly includes a manual key for operative location within the manual coupling keyway and the drive shaft keyway to secure the handle hub to the drive shaft.

Preferably the manual key is movable between (i) a key engaged position in which the manual key is located within the manual coupling keyway and the drive shaft keyway, and (ii) a key released position in which the manual key is retracted from the drive shaft keyway.

Preferably the manual drive assembly includes a key biasing means to bias the manual key to the key engaged position.

Preferably the manual drive assembly includes a handle positioning assembly operative adapted to orient the handle in an operative upright position.

Preferably the handle positioning assembly includes at least one handle locking projection.

Preferably the handle locking projection is a handle locking pin.

Preferably the handle locking pin outwardly extends from the plunger of the override actuator.

Preferably the lift-and-slide handle assembly includes a housing.

Preferably the housing includes a retention sleeve.

Preferably the retention sleeve defines at least one handle locking slot operatively associated with the handle locking pin.

Preferably the handle locking pin is adapted to move along the handle locking slot responsive to movement of the plunger when the push-button is caused to move between the button rest position and the override position.

Preferably the handle locking pin is adapted to be released from the handle locking slot to enable rotation of the handle.

According to a second aspect there is disclosed herein a lift-and-slide installation including a lift-and-slide handle assembly according to the first aspect.

Preferably the lift-and-slide installation includes at least one operable panel moveable between an open position and a closed position.

Preferably the lift-and-slide installation includes an electronic door operatively adapted from moving the at least one operable panel between the open position and the closed condition.

Preferably the lift-and-slide installation includes a control system operatively adapted to activate and deactivate the door operator.

Preferably the control system includes control communications componentry operatively adapted to communicate with door operator communications componentry of the door operator.

BRIEF DESCRIPTION OF THE DRAWINGS

Preferred embodiments of the invention will be described hereinafter, by way of examples only, with reference to the accompany drawings, wherein.

DESCRIPTION OF PREFERRED EMBODIMENTS

Figure 1:
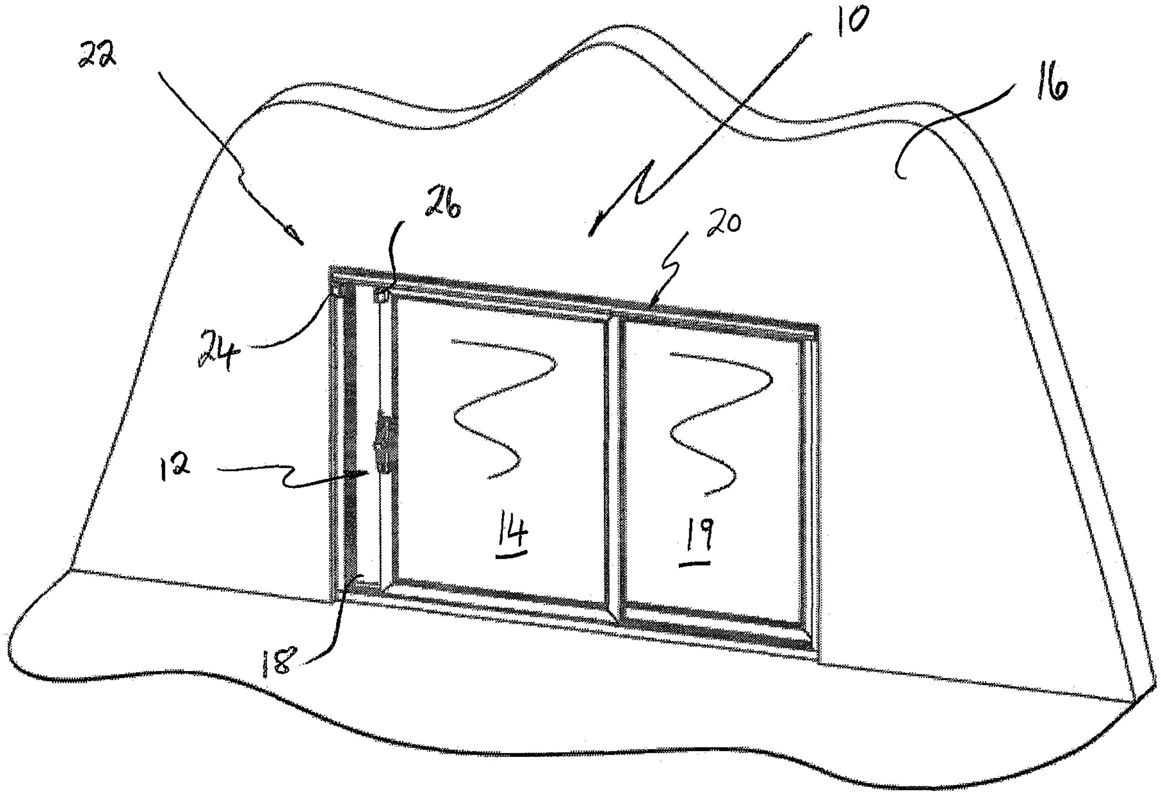
FIG. 1 is a diagrammatic perspective view of an embodiment lift-and-slide installation employing an embodiment lift-and-slide handle assembly.
Figure 2:
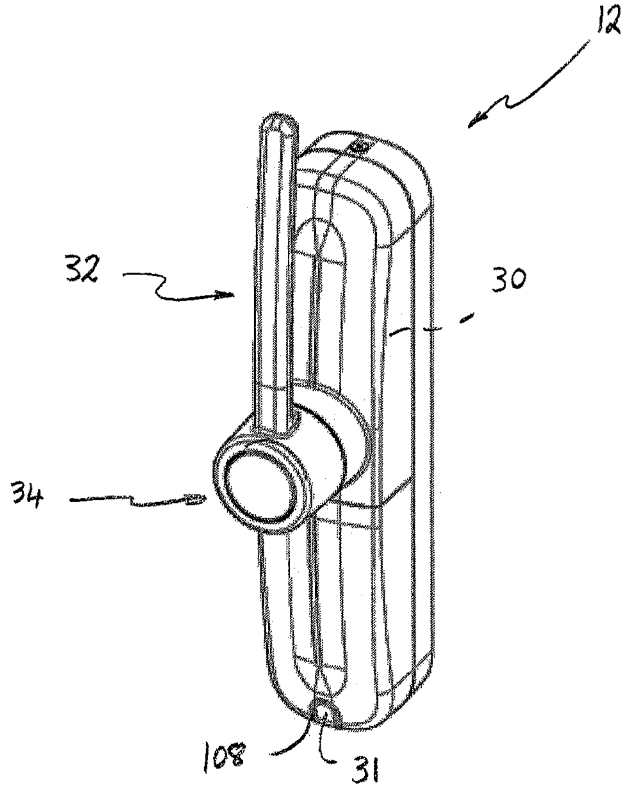
FIG. 2 is a front perspective view of an embodiment lift-and-slide handle assembly.
Figure 3:
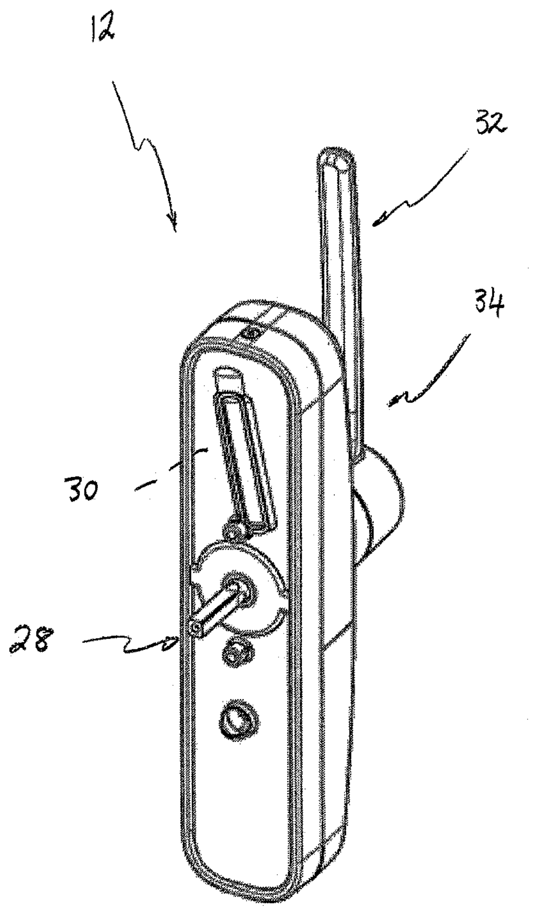
FIG. 3 is a rear perspective view of the lift-and-slide handle assembly of FIG. 2.
Figure 4:
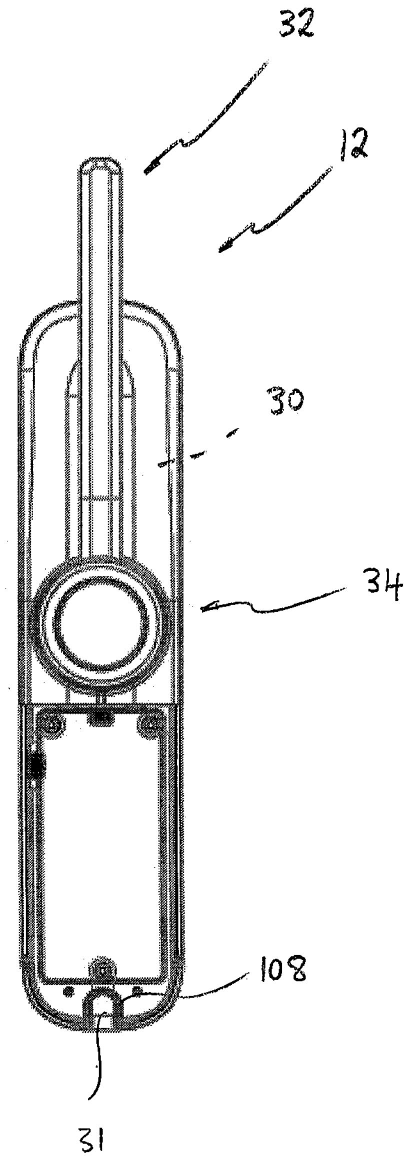
FIG. 4 is a front view of the lift-and-slide handle assembly of FIG. 2 with a battery cover removed.
Figure 5:
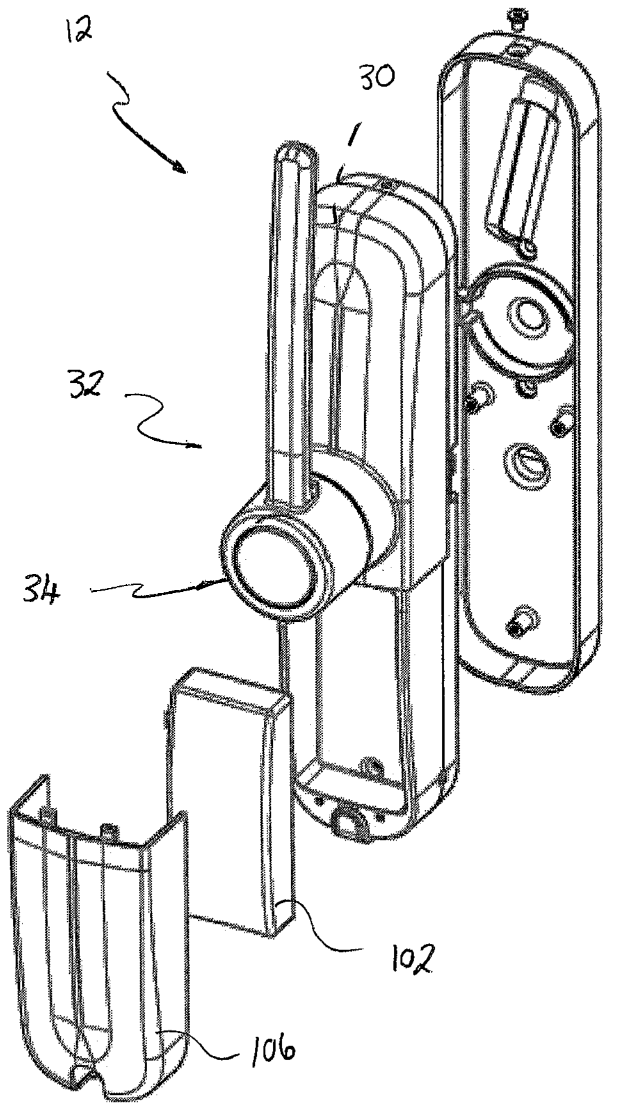
FIG. 5 is an exploded front perspective view of the lift-and-slide handle assembly of FIG. 2.

FIG. 1 shows an embodiment lift-and-slide installation, generally indicated with the reference numeral 10. The lift-and-slide installation 10 includes an embodiment lift-and-slide handle assembly 12. The lift-and-slide installation 10 further includes at least one operable panel 14 moveable between a closed position and an open position to enable a user to enter a building 16 through a doorway 18. The lift-and-slide installation 10 includes a fixed panel 19 which is fixedly secured in position.

The embodiment lift-and-slide installation 10 includes an electronic door operator 20 which is adapted to move the operable panel 14 between the open position and the closed position. In this embodiment the electronic door operator 20 is provided in the form of a multi-drive operator which is powered by a non-illustrated rechargeable battery. The multi-drive operator 20 operates in a conventional manner that will be readily understood by persons skilled in the art.

In the embodiment lift-and-slide installation 10 a wireless charging system 22 is operatively adapted to charge a rechargeable battery 102 (discussed below) of the lift-and-slide handle assembly 12. The wireless charging system 22 includes a wireless charging transmitter 24, connected to a non-illustrated electricity supply, and a wireless charging receiver 26 adapted to cooperate with the wireless charging transmitter 24 to charge the rechargeable battery 102.

The lift-and-slide installation 10 includes a non-illustrated control system operatively adapted to activate and deactivate the electronic door operator 20. The control system includes non-illustrated control communications componentry operatively adapted to communicate with door operator communications componentry of the electronic door operator 20. For example, the control communication componentry may include motion sensors to communicate with the door operator communications componentry to activate the electronic door operator 20 responsive to movement of a user approaching the operable panel 14. Alternatively, the control communication componentry may be provided by the circuitry of a mobile phone having installed thereon application software enabling communication with the door operator communication componentry to activate the electronic door operator 20 to move the operable panel 14 between the open and closed positions.

FIGS. 2 to 5 show the embodiment lift-and-slide handle assembly 12. The lift-and-slide handle assembly 12 includes an elongate drive shaft 28 operatively adapted to couple with a non-illustrated roller actuating assembly of a lift-and-slide roller carriage. The roller actuating assembly operates in a conventional manner in effecting lifting and dropping of the operable panel 14 to enable sealing of the lift-and-slide installation 10. Applying torque to the drive shaft 28 will impart torque to the roller actuating assembly to cause the lift-and-slide roller carriage to be extended or retracted. With the lift-and-slide roller carriage extended the operable panel 14 is adapted to be slid laterally to open the doorway 18. Applying torque to the drive shaft 28 to retract the carriage will cause the operable panel 14 to drop to compress a non-illustrated seal of the lift-and-slide installation to effect sealing. Operation of the lift-and-slide installation 10 in extending and retracting the lift-and-slide roller carriage will be readily understood by persons skilled in the art.

Referring also to FIGS. 6 to 14 the lift-and-slide handle assembly 12 includes an electronic drive assembly 30 operatively adapted to couple with the drive shaft 28 to apply torque to the drive shaft 28 to drive the actuating assembly in order to extend or retract the lift-and-slide roller carriage. The lift-and-slide assembly 12 also includes a manual drive assembly 32 operatively adapted to couple with the drive shaft 28 to apply torque to the drive shaft 28. The manual drive assembly 32 will be operated by a user manually exerting torque to the manual drive assembly 32. This may, for example, be required in the case of the electronic drive assembly 30 malfunctioning. In this regard the lift-and-slide handle assembly 12 includes an override coupling assembly 34 operatively adapted to decouple the electronic drive assembly 30 from the drive shaft 28 to couple the manual drive assembly 32 to the drive shaft 28.

Figure 16:
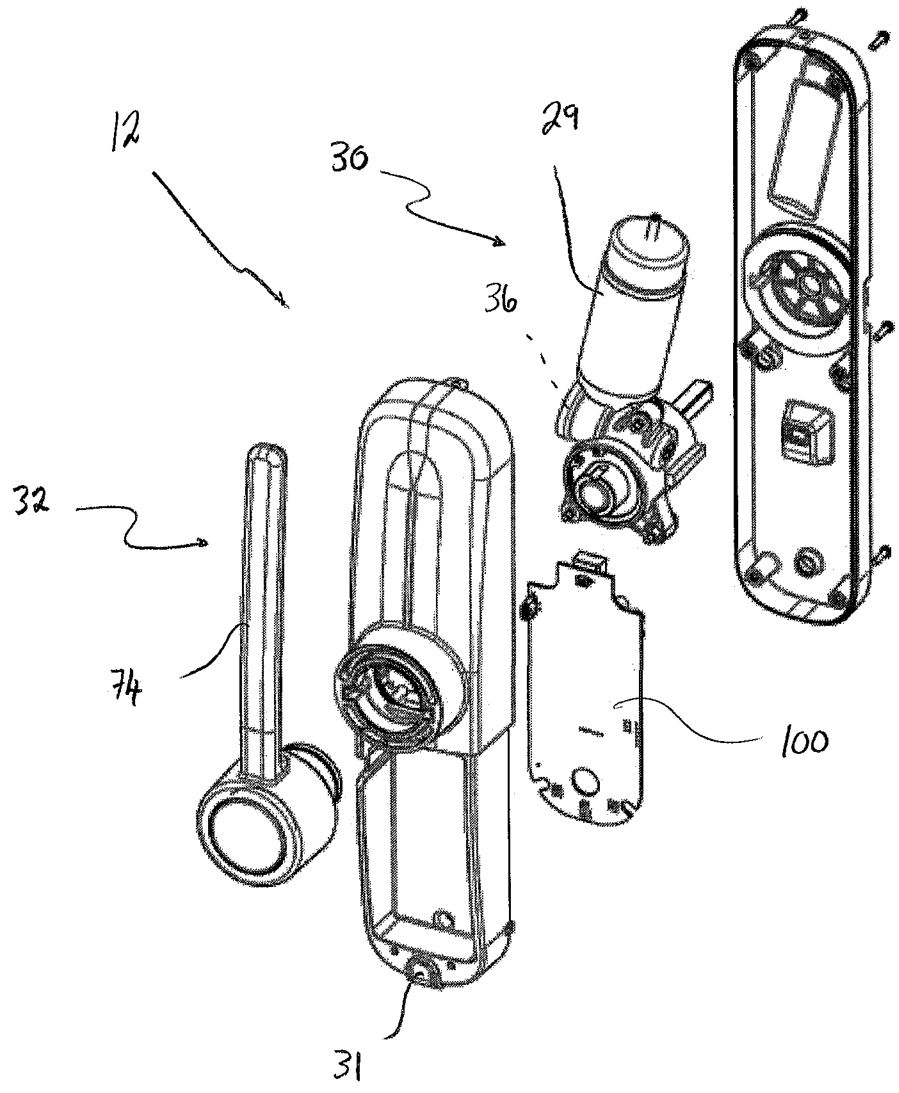
FIG. 16 is an exploded perspective view of the embodiment lift-and-slide handle assembly.
Figure 17:
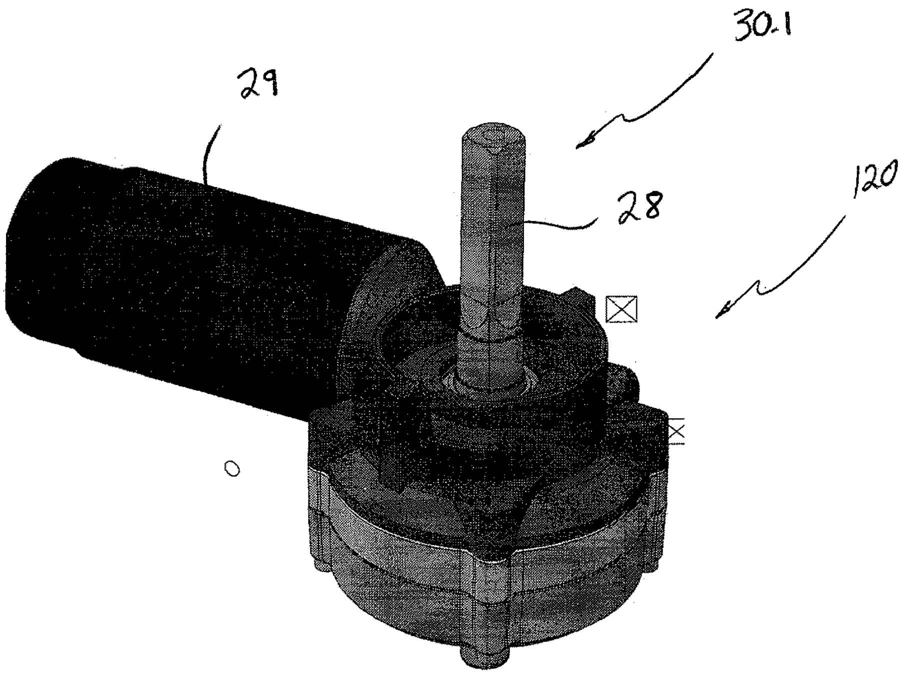
FIG. 17 is a diagrammatic perspective view of an alternative electronic drive assembly for the embodiment the lift-and-slide handle assembly.
Figure 18:
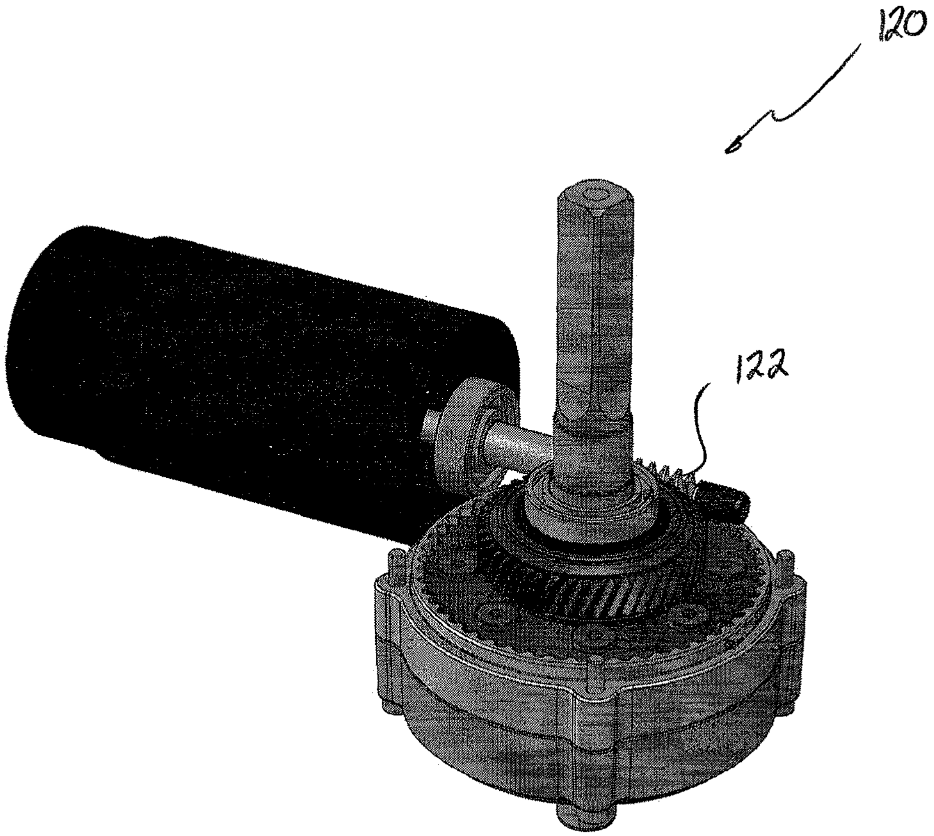
FIG. 18 is a diagrammatic perspective view of the electronic drive assembly of FIG. 17.
Figure 19:
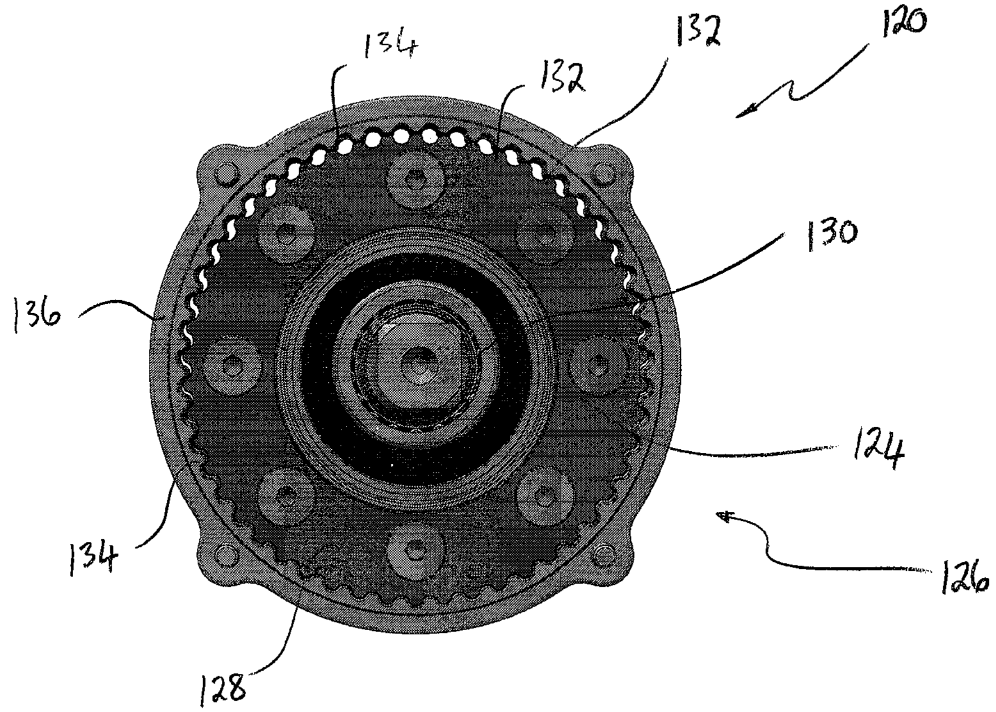
FIG. 19 is a diagrammatic front view of the electronic drive assembly of FIG. 17.
Figure 20:
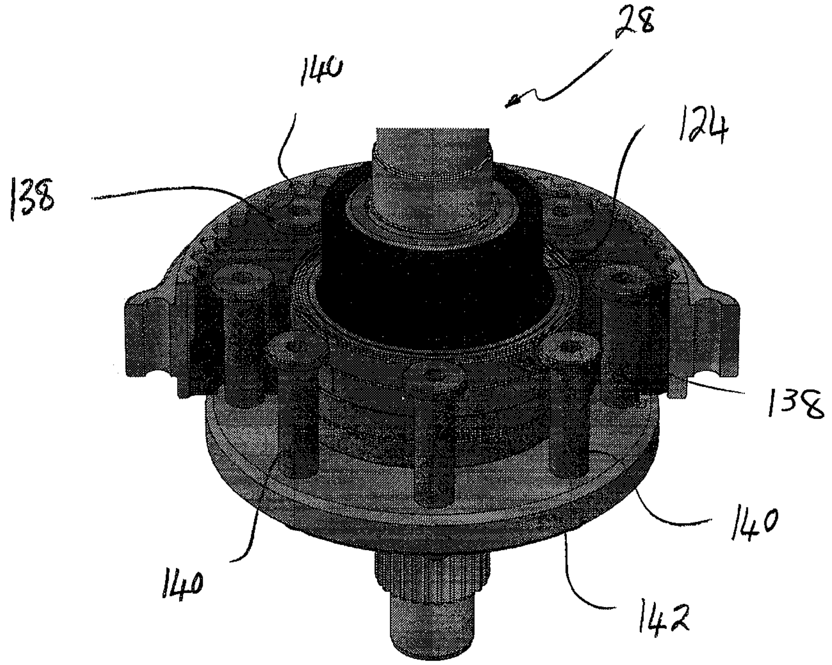
FIG. 20 is a diagrammatic perspective view of the electronic drive assembly of FIG. 19.

The electronic drive assembly 30 includes an electric motor 29, shown in FIG. 16, for generating torque in the drive shaft 28. The electric motor 29 is activated by an activation button/switch 31, shown in FIGS. 2 and 16, of the lift-and-slide handle assembly 12. The electronic drive assembly 30 includes drive gearing 36, here in the form of a double worm reduction gear assembly, operatively adapted to transmit torque from the electric motor 29 to the drive shaft 28. The override coupling assembly 34 incudes a clutch assembly 38 operatively adapted to couple and decouple the drive gearing 36 from the drive shaft 28.

Figure 8:
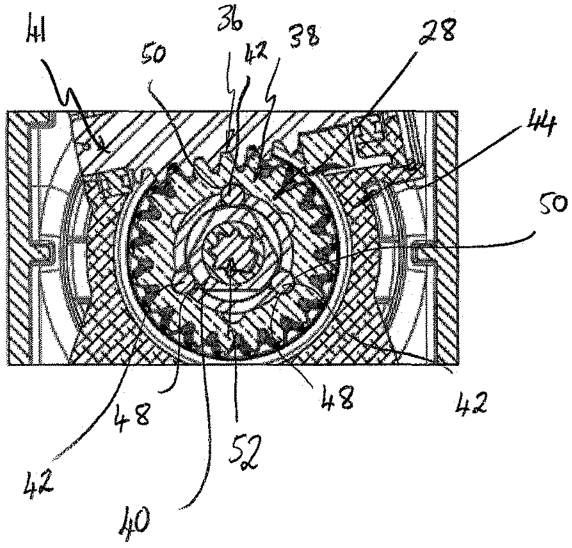
FIG. 8 is a cross-sectional view of the lift-and-slide handle assembly of FIG. 6 showing the electronic drive assembly.
Figure 9:
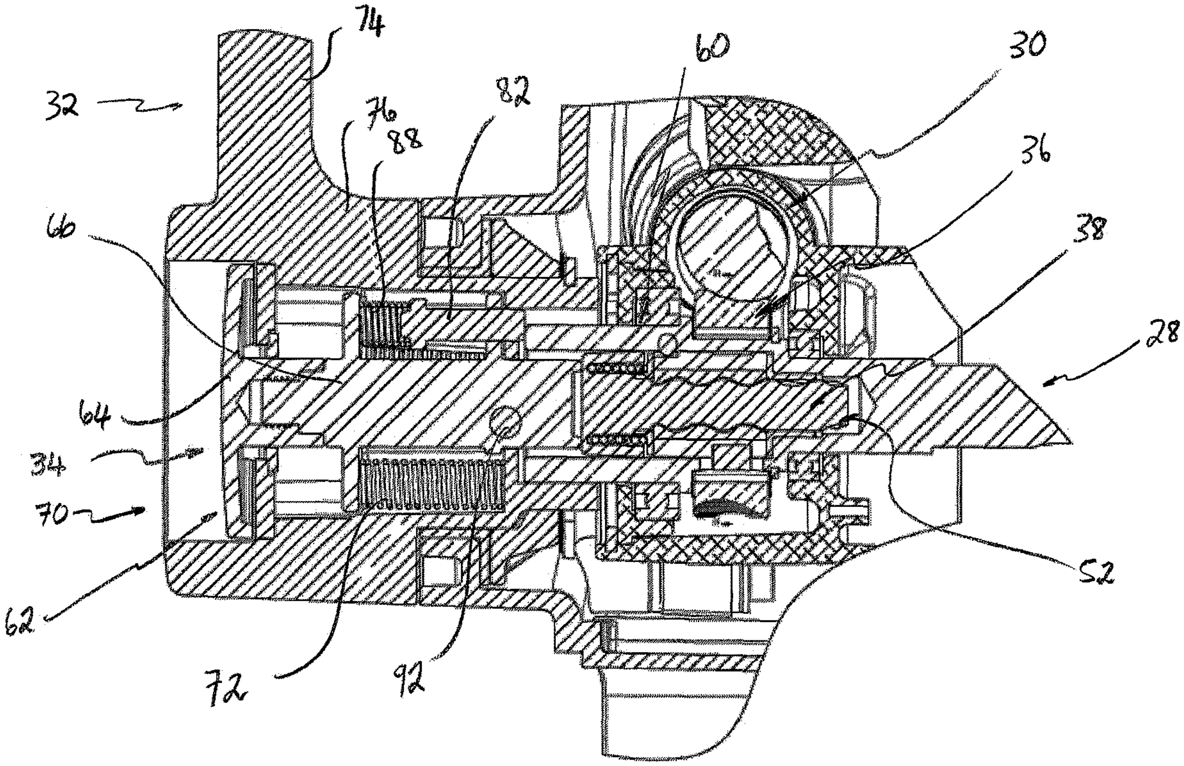
FIG. 9 is a cross-sectional view of a portion of the lift-and-slide handle assembly of FIG. 6 showing the electronic drive assembly decoupled from the drive shaft.
Figure 10:
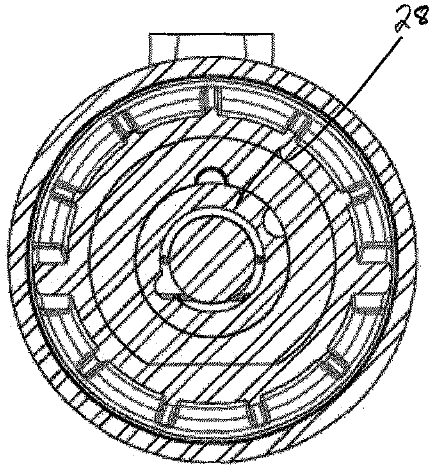
FIG. 10 is a cross-sectional view of the lift-and-slide handle assembly of FIG. 9 showing the manual drive assembly.
Figure 11:
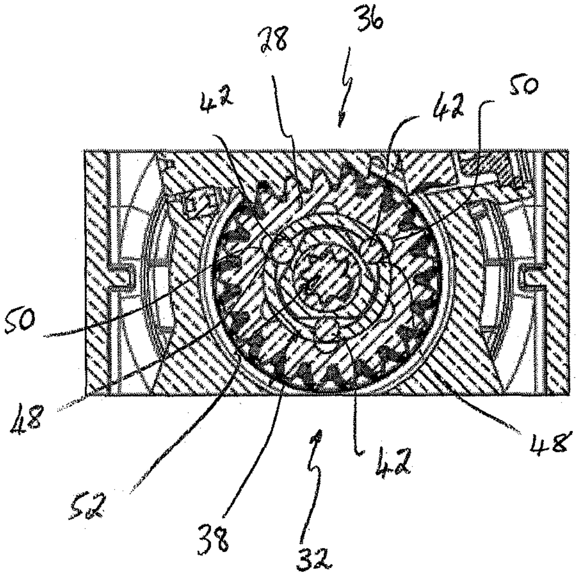
FIG. 11 is a cross-sectional view of the lift-and-slide handle assembly of FIG. 9 showing the electronic drive assembly.
Figure 14:
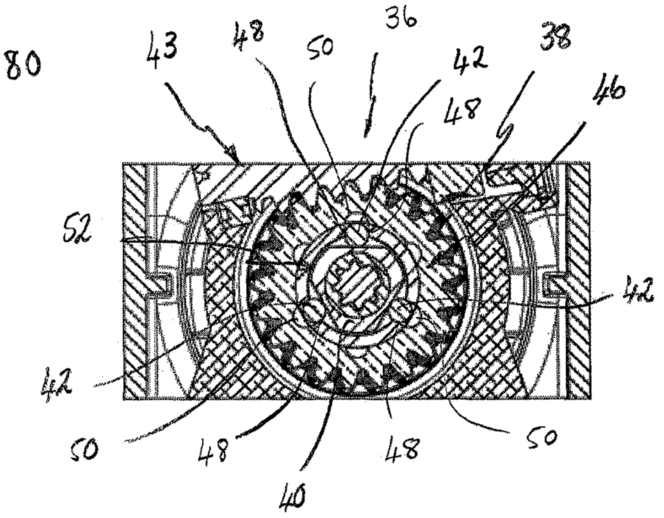
FIG. 14 is a cross-sectional view of the lift-and-slide handle assembly of FIG. 12 showing the electronic drive assembly.

The clutch assembly 38 includes a clutch cam 40 operatively adapted for movement between (i) a clutch engaged position 41, shown in FIG. 8, in which the clutch cam 40 couples the drive gearing 36 to the drive shaft 28, and (ii) a clutch released position 43, shown in FIG. 14, in which the clutch cam 40 decouples the drive gearing 36 from the drive shaft 28.

The embodiment clutch assembly 28 includes three cam followers 42 operatively associated with the drive gearing 36. The cam followers 42 are movable to a gear engaged position 44, shown in FIG. 8, when the clutch cam 40 is located in the clutch engaged position 41 such that torque is transmitted via the cam followers 42 from the drive gearing 36 to the drive shaft 28. The cam followers 42 are also moveable to a gear disengaged position 46, shown in FIG. 14, when the clutch cam 40 is located in the clutch released position 43 such that the cam followers 42 are unable to transmit torque from the drive gearing 36 to the drive shaft 28. This will facilitate rotation of the drive shaft 28 independent of the drive gearing 36.

The drive shaft 28 includes cam follower slots 48 and the drive gearing 36 includes corresponding drive gearing slots 50. In the gear engaged position 44, shown in FIG. 8, the cam followers 42 are each located inside both a cam follower slot 48 and corresponding/complemental drive gearing slot 50 so as to be adapted to transmit torque from the drive gearing 36 to the drive shaft 28. In the gear disengaged position 46, shown in FIG. 14, the at least one cam follower is retracted into the cam follower slot 48 so as to be unable to transmit torque from the drive gearing 36 to the drive shaft 28.

The clutch assembly 38 includes a clutch actuator 52 operatively adapted to move the clutch cam 40 between the clutch engaged position 41 and the clutch released position 43. In this embodiment the clutch actuator 52 is provided in the form of a clutch leadscrew which is adapted to engage a complemental leadscrew thread 54 of the clutch cam 40. The clutch actuator/leadscrew 52 is adapted to undergo lateral movement between an inoperative position 56, shown in FIG. 6, and an operative position 58, shown in FIG. 12. Such lateral movement will impart rotational movement to the clutch actuator 52. The clutch assembly 38 includes biasing means 60, here a spring, operatively adapted to bias the clutch actuator 52 to the inoperative position 56. In a non-illustrated embodiment the clutch actuator is provided in the form of a tapered pin.

The override coupling assembly 34 includes an override actuator 62. The override actuator 62 includes a push-button 64 and a plunger 66. The plunger 66 is operatively adapted to couple the push-button 64 to the clutch actuator/leadscrew 52. The push-button 64 is movable between a button rest position 68, shown in FIG. 6, and an override position 70, shown in FIG. 12. The push-button 64 includes push-button biasing means 72, here a push-button spring, operatively adapted to bias the push-button 64 to the button rest position 68.

The manual drive assembly 32 includes a handle 74 adapted for pivotal movement about a pivot axis. The handle 74 includes a handle hub 76. The handle hub 76, in turn, includes a manual coupling formation 78, shown in FIG. 13, operatively adapted to cooperate with a complemental drive shaft coupling formation 80 to apply torque to the drive shaft 28. The manual coupling formation 78 is a manual coupling keyway and the drive shaft coupling formation 80 is a drive shaft keyway operatively adapted to be located in register with the manual coupling keyway 78. The manual coupling keyway 78 is adapted to be located in register with the drive shaft keyway 80 upon rotation of the handle 74. The manual drive assembly 32 further includes a manual key 82 for operative location within the manual coupling keyway 78 and the drive shaft keyway 80, thereby securing the handle hub 76 to the drive shaft 28.

Figure 6:
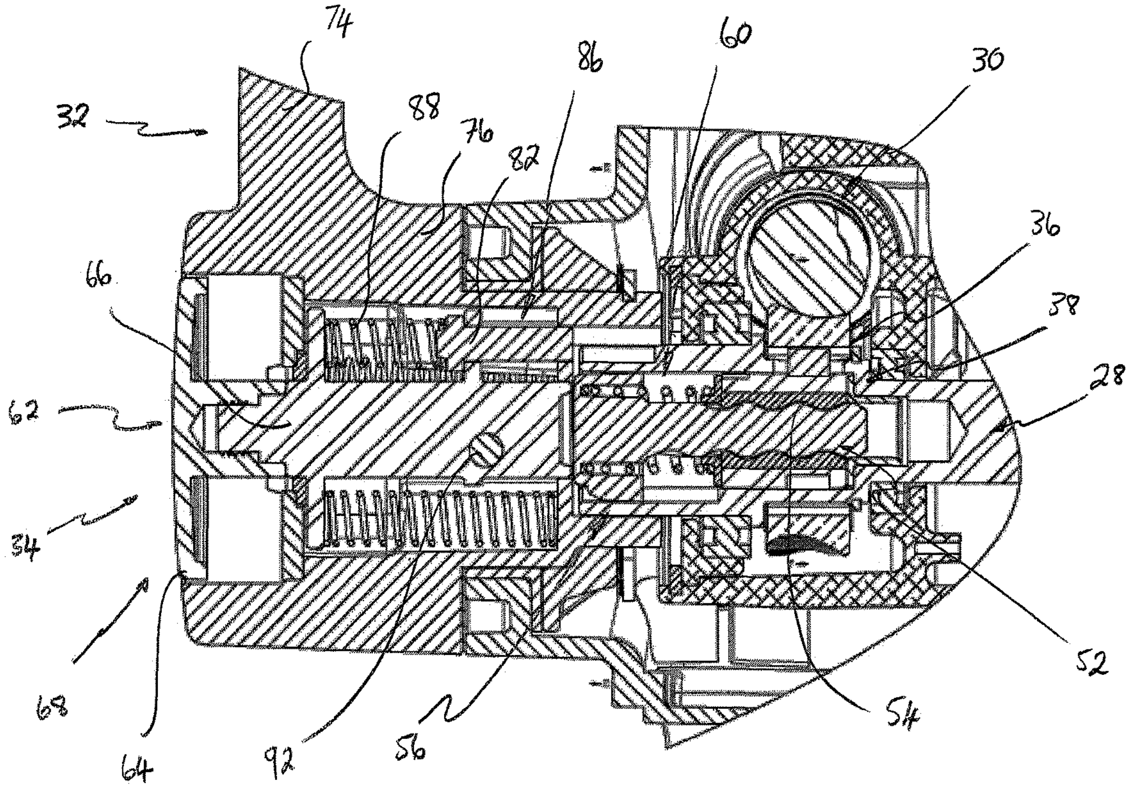
FIG. 6 is a cross-sectional view of a portion of the lift-and-slide handle assembly of FIG. 2 showing an electronic drive assembly coupling with a drive shaft.
Figure 7:
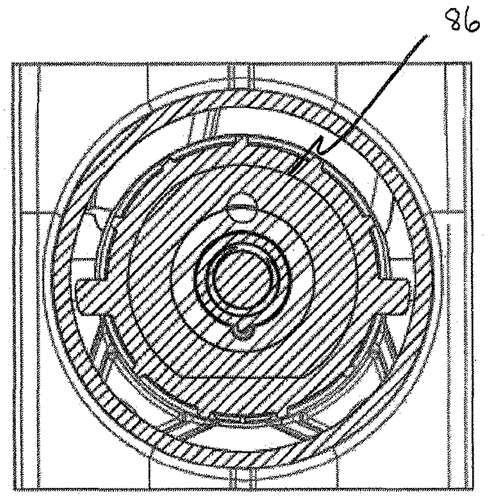
FIG. 7 is a cross-sectional view of the lift-and-slide handle assembly of FIG. 6 showing a manual drive assembly.
Figure 12:
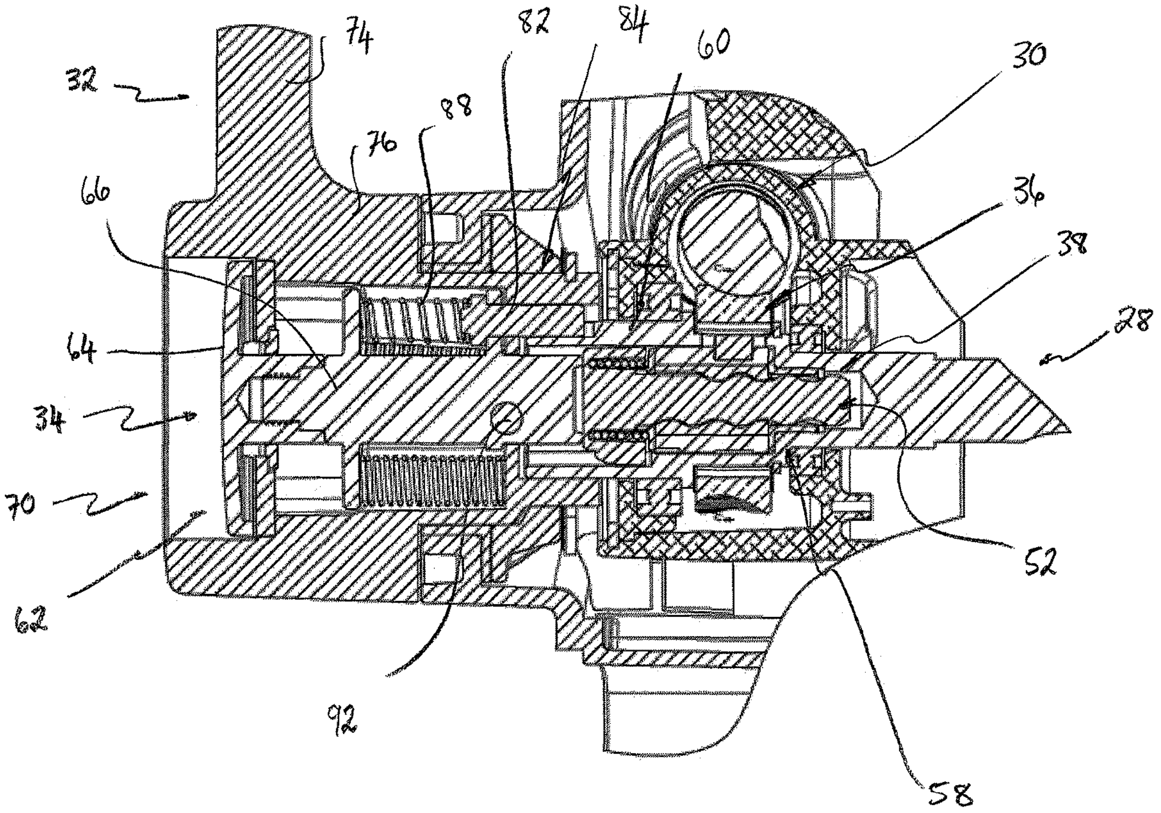
FIG. 12 is a cross-sectional view of a portion of the lift-and-slide handle assembly of FIG. 6 showing the manual drive assembly coupled to the drive shaft.
Figure 13:
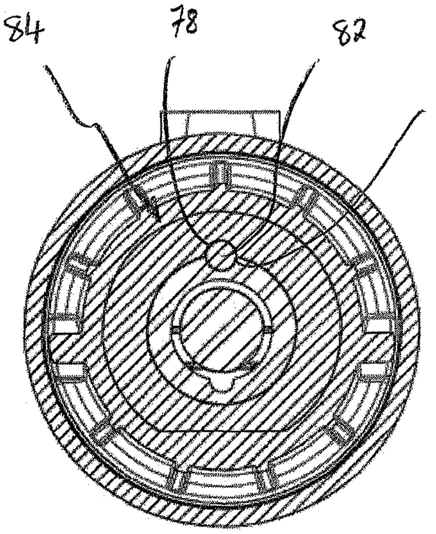
FIG. 13 is a cross-sectional view of the lift-and-slide handle assembly of FIG. 12 showing the manual drive assembly.

The manual key 82 is movable between (i) a key engaged position 84, shown in FIGS. 12 and 13, in which the manual key 82 is located within the manual coupling keyway 78 and the drive shaft keyway 80, and (ii) a key released position 86, shown in FIGS. 6 and 7, in which the manual key 82 is retracted from the drive shaft keyway 80. The manual drive assembly 32 also includes key biasing means 88, here a spring, to bias the manual key 82 to the key engaged position 84.

Figure 15:
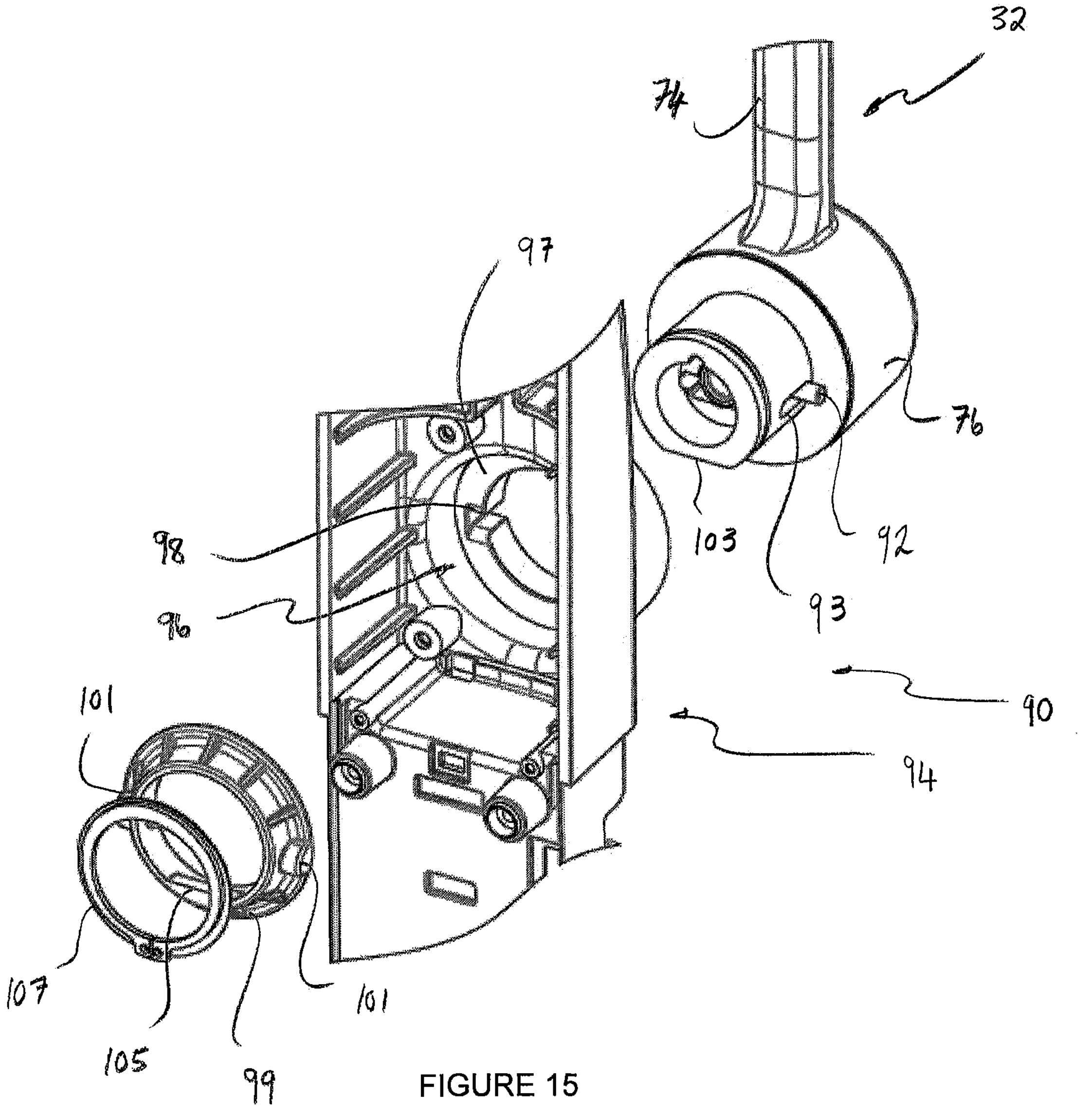
FIG. 15 is an exploded perspective view of a portion of the lift-and-slide handle assembly of FIG. 2.

Referring also to FIG. 15, the manual drive assembly 32 includes a handle positioning assembly 90 operatively adapted to orient the handle 74 in an operative upright position. The handle positioning assembly 90 includes two handle locking projections 92, here provided in the form of handle locking pins, which outwardly extend from the plunger 66 of the override actuator 62. The handle locking pins 92 project outwardly from elongate pin slots 93 and are adapted to move along the pin slots 93.

The lift-and-slide handle assembly 12 includes a housing 94. The housing 94, in turn, includes a retention sleeve 96 which defines two handle locking slots 98 operatively associated with the handle locking pins 92. The handle locking pins 92 are adapted to move along the pin slots 92 and the handle locking slots 98 responsive to movement of the plunger 66 when the push-button 64 is caused to move between the button rest position 68 and the override position 70. The handle locking pins 92 are further adapted to be released from the handle locking slots 98 to enable rotation of the handle 74 through 180°.

As with conventional lift-and-slide handle assemblies, the handle 74 is adapted to be moved through 180° from an upwardly facing orientation to a downwardly facing position to effect vertical movement of the operable panel 14. In the embodiment lift-and-slide handle assembly 12 the push-button 64 is depressed by a user to the override position 70 so that the handle locking pins 92 are released from the handle locking slots 98 enabling the handle 74 to be turned. Once the handle 74 has been turned so that the manual key 82 is located in the key engaged position 84, the push-button 64 can be released and the handle 74 continued to be rotated to the downwardly facing orientation thus extending the non-illustrated lift-and-slide roller carriage to facilitate sliding movement of the operable panel 14. It is pointed out that the handle locking slots 98 are offset from the horizontal vertical line to prevent the handle 74 being locked in the downwardly facing orientation.

The retention sleeve 96 defines a support surface 97 to support the handle locking pins 92 during rotation of the handle 74. The lift-and-slide handle assembly 12 further includes a handle retention collar 99 having opposing pockets 101 sized for accepting the handle locking pins 92 when the push-button 64 is depressed by a user. The handle 74 includes handle keying detail 103 which co-operate with complemental collar keying detail 105 to ensure proper alignment of the handle 74 with the handle retention collar 99. A circlip 107 is provided for retaining the handle 74. In an alternative embodiment the circlip 107 is replaced with a non-illustrated screw fix.

Referring to FIG. 16, the lift-and-slide handle assembly 12 includes a control printed circuit board assembly (PCBA) 100 in electronic communication with the activation button 31 and the electric motor 29. The electric motor 29 and PCBA 100 are powered by a battery 102, locatable within a battery recess 104 operatively covered by a battery cover 106 shown in FIG. 5. The PCBA 100 is in electronic communication with a user feedback indicator 108 which illuminates in different colours to provide status feedback to a user, for example (i) indication of system faults/errors, (ii) battery status, and (iii) lock/unlock status.

FIGS. 17 to 20 show an alternative electronic drive assembly 30.1 for use in the lift-and-slide handle assembly 12. The electronic drive assembly 30.1 has an electric motor 29 to apply a torque to a drive shaft 28. The electric motor 29 applies torque to the drive shaft 28 via cycloidal drive gearing 120. The cycloidal drive gearing 120 includes a worm wheel 122 which drives an input shaft 124. Two opposing eccentrics are provided, one of which is shown and indicated with the reference numeral 126. Each eccentric 126 includes two cycloidal discs 128 which are mounted to the input shaft 124 by a ball bearing 130. Cycloidal teeth 132 engage with ring gear teeth 134 of a ring gear 136 causing the cycloidal discs 128 to "walk" around the outside as the eccentric 126 rotates. The cycloidal disc 128 has one tooth less than the ring gear 136 with the result that with each rotation of the eccentric 126 the cycloidal disc 128 progresses 1 tooth around. It is pointed out that two cycloidal discs 128 are used to balance internal forces.

The cycloidal discs 128 have holes 138 through which drive pins 140 are passed. The drive pins 140 are secured to an output plate 142 causing the output plate 142 to rotate along with the cycloidal discs 128 at a 50:1 ratio to the input shaft 124. The drive shaft 28 is driven by the output plate 142 via a clutch assembly which operates in a manner corresponding to the clutch assembly 38 described above.

Preferred features of the cycloidal drive gearing include that half the number of teeth are engaged at any one time such that the load is shared across a large area providing a strong system. As the cycloidal discs 128 "walk" slowing round the outer ring gear 136, the surface contact speed is very low, quiet and efficient drive is obtained.

Although the invention has been described with reference to specific examples, it will be appreciated by those skilled in the art that the invention may be embodied in many other forms.

KEY TO REFERENCE NUMERALS

10 Lift-and-slide assembly
12 Lift-and-slide handle assembly
14 Operable panel
16 Building
18 Doorway
19 Fixed panel
20 Electronic door operator (multi-drive operator)
22 Wireless charging system
24 Wireless charging transmitter
26 Wireless charging receiver
28 Drive shaft
29 Electric motor
30 Electronic drive assembly
30.1 Alternative electronic drive assembly (FIGS. 17-20)
31 Activation button
32 Manual drive assembly
34 Override coupling assembly
36 Drive gearing
38 Clutch assembly
40 Clutch cam
41 Clutch engaged position
42 Cam followers
43 Clutch released position
44 Gear engaged position
46 Gear disengaged position
48 Cam follower slots
50 Drive gearing slots
52 Clutch actuator/leadscrew
54 Leadscrew thread
56 Inoperative position
58 Operative position
60 Biasing means
62 Override actuator
64 Push-button
66 Plunger
68 Button rest position
70 Override position
72 Push-button biasing means
74 Handle
76 Handle hub
78 Manual coupling formation/manual coupling key
80 Drive shaft coupling formation/drive shaft keyway
82 Manual key
84 Key engaged position
86 Key released position
88 Key biasing means
90 Handle positioning assembly
92 Handle locking projections/pins
93 Pin slot
94 Housing
96 Retention sleeve
97 Support surface
98 Handle locking slots
99 Handle retention collar
100 Printed circuit board assembly (PCBA)
101 Pocket
102 Battery
103 Handle keying detail
104 Battery recess
105 Collar keying detail
106 Battery cover
107 Circlip
108 Indicator
120 Cycloidal drive gearing
122 Worm wheel
124 Input shaft
126 Eccentric
128 Cycloidal disc
130 Ball bearing
132 Cycloidal teeth
134 Ring gear teeth
136 Ring gear
138 Holes
140 Drive pins
142 Output plate

The invention claimed is:

1. A lift-and-slide handle assembly including:

a drive shaft operatively adapted to couple with a roller actuating assembly of a lift-and-slide roller carriage;

an electronic drive assembly operatively adapted to couple with the drive shaft to apply torque to the drive shaft;

a manual drive assembly operatively adapted to couple with the drive shaft to apply torque to the drive shaft; and an override coupling assembly operatively adapted to decouple the electronic drive assembly from the drive shaft to couple the manual drive assembly to the drive shaft;

wherein the electronic drive assembly includes an electric motor for generating torque;

wherein the electronic drive assembly includes drive gearing operatively adapted to transmit torque from the electric motor to the drive shaft;

wherein the override coupling assembly incudes a clutch assembly operatively adapted to couple and decouple the drive gearing from the drive shaft;

wherein the clutch assembly includes a clutch cam operatively adapted for movement between (i) a clutch engaged position in which the clutch cam couples the drive gearing to the drive shaft, and (ii) a clutch released position in which the clutch cam decouples the drive gearing from the drive shaft; and wherein the clutch assembly includes at least one cam roller operatively associated with the drive gearing, the at least one cam roller adapted to roll along an outer surface of the clutch cam, the at least one cam roller movable between (i) a gear engaged position when the clutch cam is located in the clutch engaged position such that torque is transmitted via the cam roller from the drive gearing to the drive shaft, and (ii) a gear disengaged position when the clutch cam is located in the clutch released position such that the at least one cam roller is unable to transmit torque from the drive gearing to the drive shaft.

2. A lift-and-slide handle assembly according to claim 1, wherein the drive shaft includes a cam follower slot and the drive gearing includes a corresponding drive gearing slot wherein (i) in the gear engaged position the at least one cam roller is located inside both the cam follower slot and the drive gearing slot so as to be adapted to transmit torque from the drive gearing to the drive shaft, and (ii) in the gear disengaged position the at least one cam roller is retracted into the cam follower slot so as to be unable to transmit torque from the drive gearing to the drive shaft.

3. A lift-and-slide handle assembly according to claim 2, wherein the at least one cam roller is a first cam roller and the clutch assembly includes a plurality of cam rollers and the drive shaft and the drive gearing include a plurality of corresponding cam follower slots and drive gearing slots.

4. A lift-and-slide handle assembly according to claim 3, wherein the clutch assembly includes a clutch actuator operatively adapted to move the clutch cam between the clutch engaged position and the clutch released position.

5. A lift-and-slide handle assembly according to claim 4, wherein the clutch actuator is a clutch leadscrew or a tapered pin.

6. A lift-and-slide handle assembly according to claim 5, wherein the clutch leadscrew is adapted to engage a complemental leadscrew thread of the clutch cam.

7. A lift-and-slide handle assembly according to claim 5, wherein the clutch actuator is adapted to undergo lateral movement between an inoperative position and an operative position.

8. A lift-and-slide handle assembly according to claim 7, wherein the clutch assembly includes biasing means operatively adapted to bias the clutch actuator to the inoperative position.

9. A lift-and-slide handle assembly according to claim 8, wherein the override coupling assembly includes an override actuator.

10. A lift-and-slide handle assembly according to claim 1, wherein the manual drive assembly includes a handle adapted for pivotal movement.

11. A lift-and-slide handle assembly according to claim 10, wherein the handle includes a handle hub.

12. A lift-and-slide handle assembly according to claim 11, wherein the handle hub includes a manual coupling formation operatively adapted to cooperate with a complemental drive shaft coupling formation to apply torque to the drive shaft.

13. A lift-and-slide handle assembly according to claim 12, wherein the manual coupling formation is a manual coupling keyway and the drive shaft coupling formation is a drive shaft keyway operatively adapted to be located in register with the manual coupling keyway.

14. A lift-and-slide handle assembly according to claim 13, wherein the manual coupling keyway is adapted to be located in register with the drive shaft keyway upon rotation of the handle.

15. A lift-and-slide handle assembly according to claim 14, wherein the manual drive assembly includes a manual key for operative location within the manual coupling keyway and the drive shaft keyway to secure the handle hub to the drive shaft.

* * * * *